(12) United States Patent
Tsukuda et al.

(10) Patent No.: US 9,689,440 B2
(45) Date of Patent: Jun. 27, 2017

(54) POWER TRANSFER DEVICE

(71) Applicant: AISIN AW CO., LTD., Anjo-shi, Aichi-ken (JP)

(72) Inventors: Kazumichi Tsukuda, Okazaki (JP); Takeshi Asada, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 91 days.

(21) Appl. No.: 14/761,501

(22) PCT Filed: Feb. 14, 2014

(86) PCT No.: PCT/JP2014/053489
§ 371 (c)(1),
(2) Date: Jul. 16, 2015

(87) PCT Pub. No.: WO2014/126205
PCT Pub. Date: Aug. 21, 2014

(65) Prior Publication Data
US 2015/0345570 A1    Dec. 3, 2015

(30) Foreign Application Priority Data

Feb. 14, 2013   (JP) .................................. 2013-026481

(51) Int. Cl.
*F16H 59/00*   (2006.01)
*F16H 61/00*   (2006.01)
(Continued)

(52) U.S. Cl.
CPC ............. *F16D 13/76* (2013.01); *B60W 10/02* (2013.01); *B60W 10/107* (2013.01);
(Continued)

(58) Field of Classification Search
CPC .. F16H 61/66272; F16H 55/56; F16H 37/021; F16H 61/66259; Y10T 477/624
(Continued)

(56) References Cited

U.S. PATENT DOCUMENTS 3,044,316 A  *  7/1962  Forster ...................... F16H 9/12
                                                              474/12
4,482,339 A  *  11/1984  Miki ................. F16H 61/66259
                                                              474/18
(Continued)

FOREIGN PATENT DOCUMENTS

EP    0692659 A1    1/1996
EP    1441151 A2    7/2004
(Continued)

OTHER PUBLICATIONS

Mar. 10, 2016 Supplementary Search Report issued in European Patent Application No. 14752134.8.

*Primary Examiner* — Henry Liu
(74) *Attorney, Agent, or Firm* — Oliff PLC

(57) ABSTRACT

A power transfer device includes a hydraulic clutch capable of coupling and decoupling a secondary shaft of a CVT and axles to and from each other. A secondary pulley of the CVT includes a movable sheave movably supported by the secondary shaft, and a secondary piston that rotates together with the secondary shaft and that constitutes a second hydraulic actuator together with the movable sheave. The secondary piston of the second hydraulic actuator is used to define an engagement oil chamber of the hydraulic clutch.

20 Claims, 3 Drawing Sheets

(51) Int. Cl.
| | |
|---|---|
| *F16H 63/00* | (2006.01) |
| *F16D 13/76* | (2006.01) |
| *B60W 30/18* | (2012.01) |
| *B60W 10/02* | (2006.01) |
| *B60W 10/107* | (2012.01) |
| *F16H 63/06* | (2006.01) |
| *F16H 9/18* | (2006.01) |
| *F16H 55/56* | (2006.01) |

(52) U.S. Cl.
CPC ......... *B60W 30/18181* (2013.01); *F16H 9/18* (2013.01); *F16H 55/56* (2013.01); *F16H 63/065* (2013.01)

(58) Field of Classification Search
USPC ..................................................... 474/28, 18
See application file for complete search history.

(56) References Cited

U.S. PATENT DOCUMENTS

| | | | | |
|---|---|---|---|---|
| 4,530,256 A * | 7/1985 | Hattori | ................. | B60W 10/02 192/48.618 |
| 4,583,423 A * | 4/1986 | Hahne | ................. | F16H 37/022 474/28 |
| 4,747,808 A * | 5/1988 | Moan | ................. | B60W 30/18 474/18 |
| 4,904,229 A * | 2/1990 | Hattori | .............. | F16H 61/66263 474/12 |
| 4,913,686 A * | 4/1990 | Hattori | .............. | F16H 61/66263 474/18 |
| 4,950,213 A * | 8/1990 | Morisawa | ................. | F16H 3/60 184/6.12 |
| 5,176,579 A * | 1/1993 | Ohsono | ................. | F16H 57/04 474/1 |
| 5,407,394 A * | 4/1995 | Robbins | ................. | F16H 55/56 474/28 |
| 5,468,192 A * | 11/1995 | Robbins | ................. | F16H 55/56 474/28 |
| 5,720,692 A * | 2/1998 | Kashiwabara | .... | F16H 61/66272 474/28 |
| 5,931,756 A * | 8/1999 | Ohsono | ................. | F16H 9/125 474/167 |
| 6,332,856 B1 * | 12/2001 | Iwamoto | ............... | B60K 17/08 474/18 |
| 6,494,798 B1 * | 12/2002 | Onogi | .............. | F16H 61/66272 474/18 |
| 6,500,090 B2 * | 12/2002 | Kanda | .............. | F16H 61/66259 474/28 |
| 6,626,779 B2 * | 9/2003 | Ohyama | ............... | F16H 61/662 474/18 |
| 6,716,129 B2 * | 4/2004 | Bott | ........................ | F16H 55/56 474/28 |
| 6,749,530 B2 * | 6/2004 | Okano | .................... | F16H 59/38 474/12 |
| 7,311,623 B2 * | 12/2007 | Masuda | .................... | F16H 9/18 474/8 |
| 7,351,265 B2 * | 4/2008 | Vitale | ...................... | B60K 6/38 180/65.51 |
| 7,789,780 B2 * | 9/2010 | Iwasa | ...................... | F16H 59/70 474/18 |
| 7,803,076 B2 * | 9/2010 | Shioiri | .................... | F16H 55/56 474/28 |
| 7,862,459 B2 * | 1/2011 | Ishioka | ............. | F16H 61/66259 180/366 |
| 7,951,025 B2 * | 5/2011 | Mitsubori | ............... | F02B 41/00 474/16 |
| 7,988,573 B2 * | 8/2011 | Shioiri | ............. | F16H 61/66272 474/18 |
| 8,147,370 B2 * | 4/2012 | Nakajima | ................. | F16H 9/18 192/48.3 |
| 8,812,206 B2 * | 8/2014 | Totsuka | ............ | F16H 61/66272 474/28 |
| 2003/0022742 A1 * | 1/2003 | Fujimoto | ............ | F16H 61/0246 474/18 |
| 2003/0232675 A1 * | 12/2003 | Miyazaki | ................ | F16D 25/14 474/18 |
| 2005/0107194 A1 * | 5/2005 | Oishi | .................... | F01M 11/02 474/28 |
| 2005/0233842 A1 * | 10/2005 | Shioiri | ............. | F16H 61/66272 474/19 |
| 2006/0128510 A1 * | 6/2006 | Masuda | .................... | F16H 9/18 474/8 |
| 2008/0161153 A1 * | 7/2008 | Nakajima | ................. | F16H 9/18 477/39 |
| 2012/0135829 A1 * | 5/2012 | Doihara | ............ | F16H 61/66272 474/28 |
| 2012/0244974 A1 * | 9/2012 | Tsuji | ...................... | F16H 55/56 474/28 |
| 2013/0345012 A1 * | 12/2013 | Ishida | ................ | F16H 37/0846 475/210 |

FOREIGN PATENT DOCUMENTS

| | | |
|---|---|---|
| JP | H08-210382 A | 8/1996 |
| JP | 2005-170233 A | 6/2005 |
| JP | 2006-118688 A | 5/2006 |
| JP | 2010-071453 A | 4/2010 |
| JP | 2011-122671 A | 6/2011 |
| JP | 2012-036969 A | 2/2012 |

* cited by examiner

POWER TRANSFER DEVICE

TECHNICAL FIELD

The present invention relates to a power transfer device that includes a continuously variable transmission capable of outputting power from a motor mounted on a vehicle to axles after continuously changing the speed.

BACKGROUND ART

Hitherto, there has been known a power transfer device that includes: a belt-type continuously variable transmission capable of continuously changing the speed ratio between an input shaft (driving rotary shaft) on the side of an engine and an output shaft (driven rotary shaft) on the side of axles coupled to drive wheels; and a control device that executes low return control (belt return control) for returning the speed ratio of the continuously variable transmission to the lowest speed side (setting the speed ratio to the lowest speed ratio) immediately before the vehicle is stopped in order to secure the performance for restarting from a state in which the vehicle is stopped (see Patent Document 1, for example). In the power transfer device, engine torque is temporarily increased during the low return control to suppress a reduction in rotational speed of the input shaft of the continuously variable transmission so that the speed ratio can be brought closer to the lowest speed side before the vehicle is stopped even when the vehicle is abruptly stopped because of abrupt braking or the like. There has also been known a power transfer device that includes a hydraulic friction clutch provided between a power transfer shaft that serves as an output shaft of a belt-type continuously variable speed change portion and axles (see Patent Document 2, for example).

RELATED-ART DOCUMENTS

Patent Documents

[Patent Document 1] Japanese Patent Application Publication No. 2005-170233 (JP 2005-170233 A)
[Patent Document 2] Japanese Patent Application Publication No. 2011-122671 (JP 2011-122671 A)

SUMMARY OF THE INVENTION

In the power transfer device described in Patent Document 1, a relatively high hydraulic pressure is required to change the groove width of a pulley of the continuously variable transmission in executing the low return control for changing the speed ratio of the continuously variable transmission to the lowest speed side immediately before the vehicle is stopped. This may incur an increase in size of an oil pump that serves as a hydraulic pressure supply source and hence the entire device. With the power transfer device described in Patent Document 2, in contrast, the hydraulic pressure required to change the groove width of a pulley can be reduced by providing the hydraulic friction clutch between the output shaft of the continuously variable transmission and the axles and executing the low return control on the continuously variable transmission with the output shaft of the continuously variable transmission and the axles decoupled from each other by the hydraulic friction clutch. This makes it possible to suppress an increase in size of an oil pump. However, provision of such a hydraulic friction clutch increases the axial length of the power transfer device, which results in an increase in size of the entire device.

It is therefore a main object of exemplary embodiments to provide a power transfer device that includes a continuously variable transmission capable of outputting power from a motor mounted on a vehicle to axles after continuously changing the speed, in which the continuously variable transmission and the axles can be decoupled from each other and an increase in size of the device is favorably suppressed.

Exemplary embodiments provide a power transfer device that includes a continuously variable transmission and an oil pump, the continuously variable transmission including a first pulley provided on a driving rotary shaft coupled to a motor of a vehicle and having a groove with a changeable groove width, a second pulley provided on a driven rotary shaft coupled to axles of the vehicle and having a groove with a changeable groove width, a belt that extends between the first and second pulleys, a first hydraulic actuator that changes the groove width of the first pulley, and a second hydraulic actuator that changes the groove width of the second pulley, and the oil pump generating a hydraulic pressure to be supplied to the first and second hydraulic actuators, wherein:

a hydraulic clutch that couples and decouples the driven rotary shaft of the continuously variable transmission and the axles to and from each other, in which:

the second pulley of the continuously variable transmission includes a movable sheave movably supported by the driven rotary shaft, and a piston that rotates together with the driven rotary shaft and that constitutes the second hydraulic actuator together with the movable sheave; and the piston of the second hydraulic actuator is used to define an engagement oil chamber of the hydraulic clutch.

The power transfer device includes the hydraulic clutch which couples and decouples the driven rotary shaft of the continuously variable transmission and the axles to and from each other, and the second pulley of the continuously variable transmission includes the movable sheave which is movably supported by the driven rotary shaft, and the piston which rotates together with the driven rotary shaft and which constitutes the second hydraulic actuator together with the movable sheave. In the power transfer device, the piston of the second hydraulic actuator is used to define the engagement oil chamber of the hydraulic clutch. The power transfer device thus configured can execute belt return control for changing the speed ratio of the continuously variable transmission to the lowest speed side with the driven rotary shaft of the continuously variable transmission and the axles decoupled from each other by the hydraulic clutch. This makes it possible to suppress an increase in size of the oil pump which generates a hydraulic pressure to be supplied to the first and second hydraulic actuators of the continuously variable transmission. Further, the piston which constitutes the second hydraulic actuator of the continuously variable transmission is used to define the engagement oil chamber of the hydraulic clutch. Thus, it is possible to suppress an increase in axial length which is caused by providing the hydraulic clutch with a dedicated member for defining the engagement oil chamber. Thus, with the power transfer device, it is possible to favorably suppress an increase in size of the device, and to decouple the continuously variable transmission and the axles from each other.

In addition, a return spring that urges the movable sheave toward a fixed sheave of the second pulley may be disposed between the movable sheave of the second pulley and the piston of the second hydraulic actuator. Consequently, the movable sheave of the second pulley can be urged toward the fixed sheave by the return spring to restrict movement of the movable sheave in the axial direction when the vehicle is towed with a hydraulic pressure not supplied to the second hydraulic actuator of the continuously variable transmission as operation of the motor is stopped. Then, if the driven rotary shaft of the continuously variable transmission and the axles are decoupled from each other by the hydraulic clutch when the vehicle is towed, inertia from the side of the axles is not transferred to the second pulley which is provided on the driven rotary shaft of the continuously variable transmission, which eliminates the need to maintain torque generated on the movable sheave by the inertia from the side of the axles using the return spring. Thus, a compact spring with a relatively small spring constant can be adopted as the return spring, which makes it possible to easily secure a space for disposing the constituent members of the hydraulic clutch in order to make the second hydraulic actuator compact.

Further, the piston of the second hydraulic actuator may include an inner tubular portion fitted on the driven rotary shaft, a pressure reception portion that extends outward from one end of the inner tubular portion on a side of the second pulley, and an outer tubular portion that extends from an outer peripheral portion of the pressure reception portion toward a side opposite to the second pulley; and the hydraulic clutch may include a clutch piston disposed between the inner tubular portion and the outer tubular portion, a clutch hub, at least a part of which is disposed between the inner tubular portion and the outer tubular portion, a first clutch plate fitted with the outer tubular portion, and a second clutch plate that is fitted with the clutch hub and that is frictionally engageable with the first clutch plate. Consequently, the piston (outer tubular portion) of the second hydraulic actuator can be used also as the clutch drum of the hydraulic clutch, and thus it is possible to suppress an increase in axial length which is caused by providing the hydraulic clutch with a dedicated clutch drum. In addition, by disposing the constituent members of the hydraulic clutch in a space between the inner tubular portion and the outer tubular portion of the piston which constitutes the second hydraulic actuator, it is possible to favorably suppress an increase in axial length of the power transfer device which is caused by installation of the hydraulic clutch.

In addition, the piston of the second hydraulic actuator may be held by a stepped portion and a nut. The stepped portion is formed on the driven rotary shaft so as to abut against the one end of the inner tubular portion, and a nut is screwed to the driven rotary shaft on a side of the other end of the inner tubular portion. Consequently, movement of the piston of the second hydraulic actuator in the axial direction can be reliably restricted.

Exemplary embodiments also provide a power transfer device that includes a continuously variable transmission and an oil pump, the continuously variable transmission including a first pulley provided on a driving rotary shaft coupled to a motor of a vehicle and having a groove with a changeable groove width, a second pulley provided on a driven rotary shaft coupled to axles of the vehicle and having a groove with a changeable groove width, a belt that extends between the first and second pulleys, a first hydraulic actuator that changes the groove width of the first pulley, and a second hydraulic actuator that changes the groove width of the second pulley, and the oil pump generating a hydraulic pressure to be supplied to the first and second hydraulic actuators, wherein:

a hydraulic clutch that couples and decouples the driven rotary shaft of the continuously variable transmission and the axles to and from each other, in which:

the second pulley of the continuously variable transmission includes a movable sheave movably supported by the driven rotary shaft, and a piston that rotates together with the driven rotary shaft and that constitutes the second hydraulic actuator together with the movable sheave; and the piston of the second hydraulic actuator is used to define a cancellation oil chamber for canceling a centrifugal hydraulic pressure generated in an engagement oil chamber of the hydraulic clutch.

The power transfer device includes the hydraulic clutch which couples and decouples the driven rotary shaft of the continuously variable transmission and the axles to and from each other, and the second pulley of the continuously variable transmission includes the movable sheave which is movably supported by the driven rotary shaft, and the piston which rotates together with the driven rotary shaft and which constitutes the second hydraulic actuator together with the movable sheave. In the power transfer device, the piston of the second hydraulic actuator is used to define the cancellation oil chamber for canceling a centrifugal hydraulic pressure generated in the engagement oil chamber of the hydraulic clutch. The power transfer device thus configured can execute belt return control for changing the speed ratio of the continuously variable transmission to the lowest speed side with the driven rotary shaft of the continuously variable transmission and the axles decoupled from each other by the hydraulic clutch. This makes it possible to suppress an increase in size of the oil pump which serves as a generation source of a hydraulic pressure to be supplied to the first and second hydraulic actuators of the continuously variable transmission. Further, the piston which constitutes the second hydraulic actuator of the continuously variable transmission is used to define the cancellation oil chamber of the hydraulic clutch. Thus, it is possible to suppress an increase in axial length which is caused by providing the hydraulic clutch with a dedicated member for defining the cancellation oil chamber. Thus, with the power transfer device, it is possible to favorably suppress an increase in size of the device, and to decouple the continuously variable transmission and the axles from each other.

In addition, a return spring that urges the movable sheave toward a fixed sheave of the second pulley may be disposed between the movable sheave of the second pulley and the piston of the second hydraulic actuator. Consequently, a compact spring with a relatively small spring constant can be adopted as the return spring, which makes it possible to easily secure a space for disposing the constituent members of the hydraulic clutch in order to make the second hydraulic actuator compact.

Further, a pressure reception portion that extends outward from one end of the inner tubular portion on a side of the second pulley and that includes a tubular hub portion may be provided; and the hydraulic clutch may include a clutch piston that is fitted with the inner tubular portion and that defines the cancellation oil chamber together with the pressure reception portion, a clutch drum, at least a part of which is disposed so as to surround the hub portion of the pressure reception portion, a first clutch plate fitted with the hub portion of the pressure reception portion, and a second clutch plate that is fitted with the clutch drum and that is frictionally engageable with the first clutch plate. Consequently, the piston of the second hydraulic actuator can be used also as the clutch hub of the hydraulic clutch, and thus it is possible to suppress an increase in axial length which is caused by providing the hydraulic clutch with a dedicated clutch hub.

In addition, the piston of the second hydraulic actuator may be held by a stepped portion and a nut. The stepped portion is formed on the driven rotary shaft so as to abut against the one end of the inner tubular portion, and a nut is screwed to the driven rotary shaft on a side of the other end of the inner tubular portion. Consequently, movement of the piston of the second hydraulic actuator in the axial direction can be reliably restricted.

MODES FOR CARRYING OUT THE INVENTION

Now, an embodiment will be described with reference to the drawings.

Figure 1:
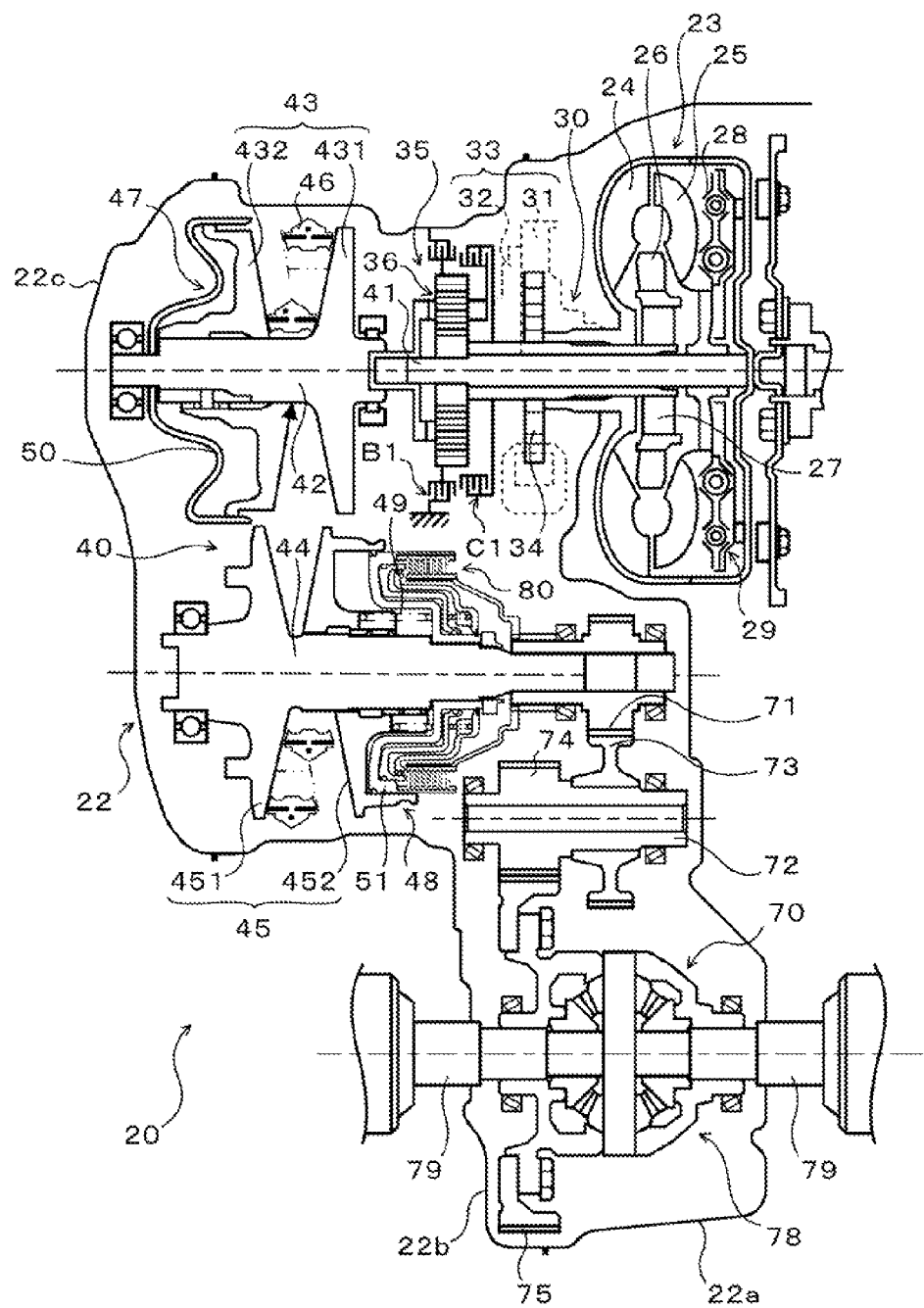
FIG. 1 illustrates a schematic configuration of a power transfer device 20 according to the an exemplary embodiment.

FIG. 1 illustrates a schematic configuration of a power transfer device 20 according to an exemplary embodiment. The power transfer device 20 illustrated in the drawing is mounted on a vehicle, connected to a crankshaft of an engine (not illustrated), and capable of transferring power from the engine to left and right drive wheels (not illustrated). As illustrated in the drawing, the power transfer device 20 includes: a transmission case 22 composed of a converter housing 22a, a transaxle case 22b, and a rear cover 22c integrally coupled to each other, a starting device 23 housed inside the transmission case 22, an oil pump 30, a forward/reverse switching mechanism 35, a continuously variable transmission (CVT) 40, a hydraulic control device (not illustrated) connected to the oil pump 30, a gear mechanism 70, a differential gear (differential mechanism) 78, and so forth.

The starting device 23 is constituted as a fluidic starting device with a lock-up clutch, and housed inside the converter housing 22a. As illustrated in FIG. 1, the starting device 23 includes a pump impeller 24 connected to the crankshaft of the engine via a front cover that serves as an input member, a turbine runner 25 fixed to an input shaft 41 of the CVT 40, a stator 26 disposed inside the pump impeller 24 and the turbine runner 25 to rectify the flow of working oil (ATF) from the turbine runner 25 to the pump impeller 24, a one-way clutch 27 that restricts rotation of the stator 26 to one direction, a damper mechanism 28, a lock-up clutch 29, and so forth.

The pump impeller 24, the turbine runner 25, and the stator 26 function as a torque amplifier (torque converter) through the action of the stator 26 when the rotational speed difference between the pump impeller 24 and the turbine runner 25 is large, and function as a fluid coupling when the rotational speed difference between the pump impeller 24 and the turbine runner 25 is small. It should be noted, however, that the starting device 23 may not be provided with the stator 26 and the one-way clutch 27 so that the pump impeller 24 and the turbine runner 25 function only as a fluid coupling. In addition, the damper mechanism 28 includes an input element coupled to the lock-up clutch 29, an intermediate element coupled to the input element via a plurality of first elastic members, an output element coupled to the intermediate element via a plurality of second elastic members and fixed to a turbine hub, and so forth, for example.

The lock-up clutch 29 selectively establishes and releases lock-up in which the pump impeller 24 and the turbine runner 25, that is, the front cover and the input shaft 41 of the CVT 40, are mechanically coupled to each other (via the damper mechanism 28). When a predetermined lock-up on condition is met after the vehicle starts moving, the lock-up clutch 29 locks (directly couples) the pump impeller 24 and the turbine runner 25 to each other so that power from the engine is mechanically and directly transferred to the input shaft 41. In this event, the damper mechanism 28 damps vibration between the front cover and the input shaft 41. The lock-up clutch 29 may be constituted as a hydraulic single-plate friction clutch, or may be constituted as a hydraulic multi-plate friction clutch.

The oil pump 30 is constituted as a so-called gear pump that includes a pump assembly 33 composed of a pump body 31 and a pump cover 32 disposed between the starting device 23 and the forward/reverse switching mechanism 35, and an externally toothed gear 34. The pump body 31 and the pump cover 32 are fixed to the converter housing 22a or the transaxle case 22b. In addition, the externally toothed gear 34 is coupled to the pump impeller 24 via a hub. Thus, when the externally toothed gear 34 is rotated by power from the engine, the oil pump 30 suctions working oil (ATF) stored in an oil pan (not illustrated) via a strainer (not illustrated), and discharges the working oil, the pressure of which has been raised. Consequently, it is possible to supply working oil from the oil pump 30 to the hydraulic control device which regulates a hydraulic pressure required by the starting device 23, the forward/reverse switching mechanism 35, the CVT 40, and so forth, and to supply working oil that serves as a lubrication medium from at least one of the oil pump 30 and the hydraulic control device to predetermined portions such as the CVT 40, the one-way clutch 27, and the forward/reverse switching mechanism 35 and objects to be lubricated such as various bearings.

The forward/reverse switching mechanism 35 is housed inside the transaxle case 22b, and includes a double-pinion planetary gear mechanism 36, and a brake B1 and a clutch C1 that are hydraulic friction engagement elements. The planetary gear mechanism 36 includes a sun gear fixed to the input shaft 41 of the CVT 40, a ring gear, and a carrier that supports a pinion gear meshed with the sun gear and a pinion gear meshed with the ring gear and that is coupled to a primary shaft 42 of the CVT 40. The brake B1 can make the ring gear of the planetary gear mechanism 36 rotatable with respect to the transaxle case 22b, and make the ring gear of the planetary gear mechanism 36 stationary with respect to the transaxle case 22b when a hydraulic pressure is supplied from the hydraulic control device. Meanwhile, the clutch C1 can make the carrier of the planetary gear mechanism 36 rotatable with respect to the input shaft 41 (sun gear), and make the carrier of the planetary gear mechanism 36 stationary with respect to the input shaft 41 when a hydraulic pressure is supplied from the hydraulic control device. Consequently, by disengaging the brake B1 and engaging the clutch C1, it is possible to transfer power transferred to the input shaft 41 as it is to the primary shaft 42 of the CVT 40 to drive the vehicle forward. By engaging the brake B1 and disengaging the clutch C1, meanwhile, it is possible to transfer rotation of the input shaft 41 to the primary shaft 42 of the CVT 40 with the rotation inverted to drive the vehicle in reverse. By disengaging the brake B1 and the clutch C1, further, it is possible to release connection between the input shaft 41 and the primary shaft 42.

The CVT 40 includes: a primary pulley 43 provided on the primary shaft 42 which serves as a driving rotary shaft and having a groove with a changeable groove width; a secondary pulley 45 provided on a secondary shaft 44 that serves as a driven rotary shaft disposed in parallel with the primary shaft 42 and having a groove with a changeable groove width; a belt 46 that extends between the groove of the primary pulley 43 and the groove of the secondary pulley 45; a first hydraulic actuator 47 that changes the groove width of the primary pulley 43; and a second hydraulic actuator 48 that changes the groove width of the secondary pulley 45. The primary pulley 43 includes a fixed sheave 431 formed integrally with the primary shaft 42, a movable sheave 432 supported on the primary shaft 42 so as to be movable in the axial direction via a roller spline, and a primary piston 50. The secondary pulley 45 includes a fixed sheave 451 formed integrally with the secondary shaft 44, a movable sheave 452 supported on the secondary shaft 44 so as to be movable in the axial direction via a roller spline and urged in the axial direction by a return spring 49 that is a compression spring, and a secondary piston 51.

The first hydraulic actuator 47 is composed of the movable sheave 432 of the primary pulley 43, and the primary piston 50 which is disposed behind the movable sheave 432 so as to be movable in the axial direction and which defines an oil chamber together with the movable sheave 432. The second hydraulic actuator 48 is composed of the movable sheave 452 of the secondary pulley 45, and the secondary piston 51 which is disposed behind the movable sheave 452 so as to be rotatable together with the secondary shaft 44 and which defines an oil chamber 48c together with the movable sheave 432. A hydraulic pressure is supplied from the hydraulic control device to the first hydraulic actuator 47 and the second hydraulic actuator 48 in order to vary the groove widths of the primary pulley 43 and the secondary pulley 45. This makes it possible to output power transferred from the engine to the primary shaft 42 via the starting device 23 and the forward/reverse switching mechanism 35 after continuously changing the speed. Then, the power output to the secondary shaft 44 is transferred to the left and right drive wheels via the gear mechanism 70, the differential gear 78, and axles 79.

The gear mechanism 70 includes: a counter drive gear 71 rotatably supported by the transaxle case 22b via a bearing and having a hollow portion through which the secondary shaft 44 of the CVT 40 is rotatably inserted; a counter shaft 72 that extends in parallel with the secondary shaft 44 and the axles 79 and that is rotatably supported by the transaxle case 22b via a bearing; a counter driven gear 73 fixed to the counter shaft 72 and meshed with the counter drive gear 71; a drive pinion gear (final drive gear) 74 formed (or fixed) on the counter shaft 72; and a differential ring gear (final driven gear) 75 meshed with the drive pinion gear 74 and coupled to the differential gear 78. In the power transfer device 20 according to the embodiment, a hydraulic clutch 80 capable of coupling and decoupling the secondary shaft 44 and the counter drive gear 71 to and from each other is disposed between the movable sheave 452 of the secondary pulley 45 of the CVT 40 and the counter drive gear 71 of the gear mechanism 70.

Figure 2:
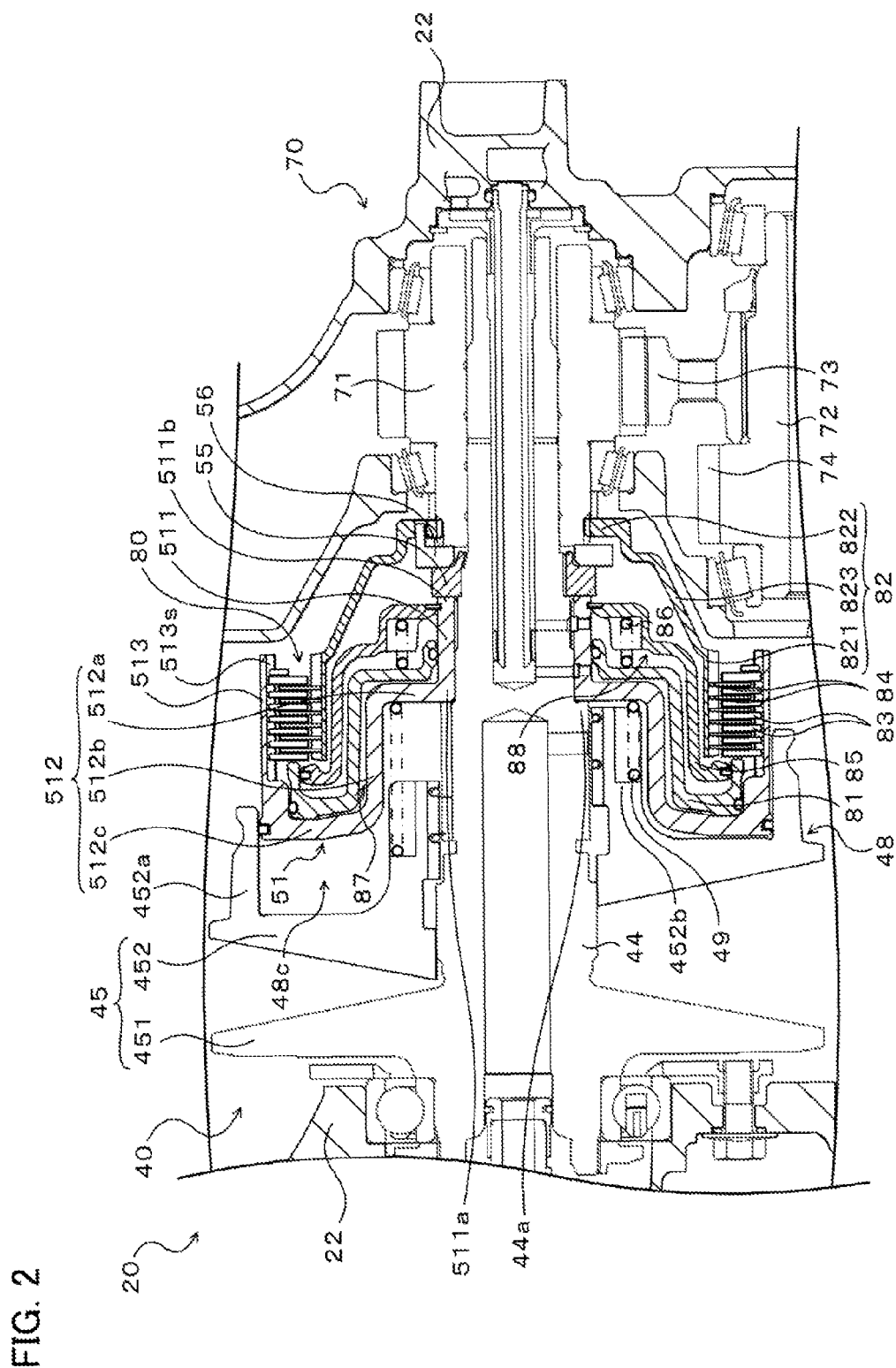
FIG. 2 is an enlarged partial sectional view illustrating an essential portion of the power transfer device 20.

FIG. 2 is an enlarged partial sectional view illustrating an essential portion of the power transfer device 20. As illustrated in the drawing, the secondary piston 51 which constitutes the second hydraulic actuator 48 of the CVT 40 is constituted as a tubular member that includes: an inner tubular portion 511 fitted on the secondary shaft 44 to extend in the axial direction of the secondary shaft 44; a pressure reception portion 512 that extends outward from one end 511a of the inner tubular portion 511 on the side of the secondary pulley 45; and an outer tubular portion (drum portion) 513 that extends in the axial direction of the secondary shaft 44 from the outer peripheral portion of the pressure reception portion 512 toward the side opposite to the secondary pulley 45 away from the secondary pulley 45.

The inner tubular portion 511 of the secondary piston 51 has splines that are formed on at least a part of the inner peripheral surface and that are engageable with splines formed on the outer peripheral surface of the secondary shaft 44. The pressure reception portion 512 includes: a first pressure reception portion 512a that extends outward in the radial direction of the secondary shaft 44 from the one end 511a of the inner tubular portion 511; an axially extending portion 512b that extends in the axial direction of the secondary shaft 44 from the outer peripheral portion of the first pressure reception portion 512a toward the secondary pulley 45; and a second pressure reception portion 512c that extends outward in the radial direction of the secondary shaft 44 from one end of the axially extending portion 512b on the side of the secondary pulley 45.

The secondary piston 51 is fitted on the secondary shaft 44 with the one end 511a of the inner tubular portion 511 on the side of the secondary pulley 45 abutting against a stepped portion 44a formed on the secondary shaft 44 and with the splines formed on the inner peripheral surface of the inner tubular portion 511 and the splines formed on the outer peripheral surface of the secondary shaft 44 engaged with each other. Consequently, the secondary piston 51 can rotate together with the secondary shaft 44. In addition, a screw portion is formed on the outer peripheral surface of the secondary shaft 44 so as to be positioned in the vicinity of the other end 511b of the inner tubular portion 511 with the inner tubular portion 511 of the secondary piston 51 fitted thereon, and a nut 55 is screwed to the screw portion so as to abut against the other end 511b of the inner tubular portion 511. Consequently, movement of the secondary piston 51 in the axial direction of the secondary shaft 44 can be reliably restricted by the stepped portion 44a and the nut 55.

Meanwhile, a tubular extending portion 452a that extends in the axial direction toward the side opposite to the fixed sheave 451 (rightward in the drawing, that is, toward the counter drive gear 71) is formed on the outer peripheral portion of the movable sheave 452 of the secondary pulley 45. The movable sheave 452 is movably supported by the secondary shaft 44 such that the inner peripheral surface of the tubular extending portion 452a and the outer tubular portion 513 of the secondary piston 51 are in sliding contact with each other via a seal member. Consequently, the movable sheave 452 and the secondary piston 51 define the oil chamber 48c, and the movable sheave 452 can be moved in the axial direction of the secondary shaft 44 by supplying a hydraulic pressure regulated by the hydraulic control device to the oil chamber 48c via an oil passage formed in the secondary shaft 44.

Further, the return spring 49 is disposed between the first pressure reception portion 512a of the secondary piston 51 and an abutment portion 452b formed on the movable sheave 452. The return spring 49 urges the movable sheave 452 toward the fixed sheave 451. Consequently, the movable sheave 452 of the secondary pulley 45 can be urged toward the fixed sheave 451 by the return spring 49 to restrict movement of the movable sheave 452 even if a hydraulic pressure is not supplied from the hydraulic control device to the second hydraulic actuator 48 when the vehicle is towed with operation of the oil pump 30 stopped as operation of the engine is stopped.

In the embodiment, the secondary piston 51 configured as discussed above is used also as a clutch drum of the hydraulic clutch 80. The hydraulic clutch 80 is constituted as a hydraulic multi-plate friction clutch that includes: a clutch piston 81 disposed in a space between the inner tubular portion 511 and the outer tubular portion 513 of the secondary piston 51; a clutch hub 82 supported by the counter drive gear 71; a plurality of first clutch plates (separator plates) 83, the outer peripheral portion of which is fitted with splines 513s formed on the inner peripheral surface of the outer tubular portion (drum portion) 513 of the secondary piston 51; and a plurality of second clutch plates (friction plates) 84, the inner peripheral portion of which is fitted with splines formed on the outer peripheral surface of the clutch hub 82 and which are frictionally engageable with the plurality of first clutch plates 83.

The clutch piston 81 is disposed between the inner tubular portion 511 and the outer tubular portion 513 of the secondary piston 51 so as to be movable in the axial direction of the secondary shaft 44. A seal member is disposed between the inner peripheral portion of the clutch piston 81 and the outer peripheral surface of the inner tubular portion 511 of the secondary piston 51, and between the outer peripheral portion of the clutch piston 81 and the inner peripheral surface of the outer tubular portion 513 of the secondary piston 51. Consequently, the clutch piston 81 defines an engagement oil chamber 87 together with the secondary piston 51. That is, the secondary piston 51 which constitutes the second hydraulic actuator 48 is used also as the clutch drum of the hydraulic clutch 80, and used to define the engagement oil chamber 87 of the hydraulic clutch 80.

The clutch hub 82 includes: a tubular portion 821, with which the second clutch plates 84 are spline-fitted; a base end portion 822 supported by the counter drive gear 71; and an intermediate portion 823 that extends between the tubular portion 821 and the base end portion 822. The clutch hub 82 is disposed such that the tubular portion 821 is positioned between the inner tubular portion 511 and the outer tubular portion 513 of the secondary piston 51, and the base end portion 822 of the clutch hub 82 is coupled (fixed) to one end portion of the counter drive gear 71 on the side of the secondary pulley 45 via splines. Consequently, the clutch hub 82 and the counter drive gear 71 can rotate together with each other. A spacer 56 is disposed between the one end portion of the counter drive gear 71 to which the base end portion 822 of the clutch hub 82 is coupled and the nut 55.

Further, a cancellation plate 85 that defines a cancellation oil chamber 88 for canceling a centrifugal hydraulic pressure generated in the secondary piston 51, that is, in the engagement oil chamber 87, together with the clutch piston 81 is disposed between the clutch piston 81 and the clutch hub 82. The cancellation plate 85 includes an inner peripheral portion fitted with the inner tubular portion 511 of the secondary piston 51 and an outer peripheral portion that is in sliding contact with the inner peripheral surface of the clutch piston 81 via a seal member. A return spring 86 is disposed between the clutch piston 81 and the cancellation plate 85. Movement of the cancellation plate 85 in the axial direction is restricted by a snap ring attached to the inner tubular portion 511 of the secondary piston 51.

By using the secondary piston 51 which constitutes the second hydraulic actuator 48 of the CVT 40 also as the clutch drum of the hydraulic clutch 80 as discussed above, it is possible to suppress an increase in axial length which is caused by providing the hydraulic clutch 80 with a dedicated clutch drum. In addition, by disposing the clutch piston 81, a part of the clutch hub 82 (tubular portion 821), the cancellation plate 85, and the return spring 86, which are constituent members of the hydraulic clutch 80, in a space between the inner tubular portion 511 and the outer tubular portion 513 of the secondary piston 51, it is possible to favorably suppress an increase in axial length and radial dimension of the power transfer device 20 due to installation of the hydraulic clutch 80.

In the power transfer device 20 configured as discussed above, when working oil is supplied from the oil pump 30 to the hydraulic control device along with operation of the engine, a hydraulic pressure regulated by the hydraulic control device is supplied to the engagement oil chamber 87 and the cancellation oil chamber 88 of the hydraulic clutch 80 via oil passages formed in the secondary shaft 44 and the secondary piston 51. Then, when a hydraulic pressure is supplied to the engagement oil chamber 87, the clutch piston 81 which has received a hydraulic pressure moves toward the first and second clutch plates 83 and 84, and the first and second clutch plates 83 and 84 are sandwiched between the clutch piston 81 and an abutment member fixed to the secondary piston 51 (outer tubular portion 513). Consequently, the hydraulic clutch 80 is engaged (completely engaged), and the secondary piston 51 and the clutch huh 82 are coupled to each other by a friction force that acts between the first and second clutch plates 83 and 84.

When the hydraulic clutch 80 is engaged in this way, the secondary shaft 44 of the CVT 40 which is integrated with the secondary piston 51 and the counter drive gear 71, that is, the axles 79, coupled to the clutch huh 82 are coupled to each other, and power from the engine can be transferred to the left and right drive wheels via the gear mechanism 70, the differential gear 78, and the axles 79 with the speed changed by the CVT 40.

In the power transfer device 20, in addition, working oil is no longer supplied from the oil pump 30 to the hydraulic control device as operation of the engine is stopped, and a hydraulic pressure is no longer supplied from the hydraulic control device to the engagement oil chamber 87 of the hydraulic clutch 80. Consequently, the hydraulic clutch 80 decouples the secondary shaft 44 of the CVT 40 which is integrated with the secondary piston 51 and the counter drive gear 71 which is coupled to the clutch hub 82 from each other, which decouples the secondary shaft 44 of the CVT 40 and the axles 79 from each other.

As described above, the power transfer device 20 according to an exemplary embodiment includes the hydraulic clutch 80 which couples and decouples the secondary shaft 44 of the CVT 40 and the axles 79 to and from each other, and the secondary pulley 45 of the CVT 40 includes the movable sheave 452 which is movably supported by the secondary shaft 44, and the secondary piston 51 which rotates together with the secondary shaft 44 and which constitutes the second hydraulic actuator 48 together with the movable sheave 452. Consequently, the power transfer device 20 can execute belt return control for changing the speed ratio of the CVT 40 to the lowest speed side with the secondary shaft 44 of the CVT 40 and the axles 79 decoupled from each other by the hydraulic clutch 80 immediately before and while the vehicle is stopped. This makes it possible to suppress an increase in size of the oil pump 30 which generates a hydraulic pressure to be supplied to the first and second hydraulic actuators 47 and 48 of the CVT 40. Further, in the power transfer device 20, as discussed above, the secondary piston 51 which constitutes the second hydraulic actuator 48 is used to define the engagement oil chamber 87 of the hydraulic clutch 80. Thus, it is possible to suppress an increase in axial length which is caused by providing the hydraulic clutch 80 with a dedicated member for defining the engagement oil chamber 87. As a result, with the power transfer device 20, it is possible to favorably suppress an increase in size of the device, and to decouple the CVT 40 and the axles 79 from each other.

In addition, the return spring 49 which urges the movable sheave 452 toward the fixed sheave of the secondary pulley 45 is disposed between the movable sheave 452 of the secondary pulley 45 and the secondary piston 51 of the second hydraulic actuator 48. Consequently, the movable sheave 452 of the secondary pulley 45 can be urged toward the fixed sheave 451 by the return spring 49 to restrict movement of the movable sheave 452 when the vehicle is towed with a hydraulic pressure not supplied to the second hydraulic actuator 48 of the CVT 40 as operation of the engine is stopped. In the power transfer device 20, when the vehicle is towed, working oil is no longer supplied from the oil pump 30 to the hydraulic control device as operation of the engine is stopped, and a hydraulic pressure is no longer supplied from the hydraulic control device to the engagement oil chamber 87 of the hydraulic clutch 80. Thus, the secondary shaft 44 of the CVT 40 and the axles 79 are decoupled from each other by the hydraulic clutch 80. Therefore, inertia from the side of the axles 79 is not transferred to the secondary pulley 45 which is provided on the secondary shaft 44 of the CVT 40, which eliminates the need to maintain torque generated on the movable sheave 452 by the inertia from the side of the axles 79 using the return spring 49. Thus, in the power transfer device 20, a compact spring with a relatively small spring constant can be adopted as the return spring 49 which holds the movable sheave 452 of the secondary pulley 45, which makes it possible to easily secure a space for disposing the constituent members of the hydraulic clutch 80 in order to make the second hydraulic actuator 48 compact.

Further, the secondary piston 51 of the second hydraulic actuator 48 includes: the inner tubular portion 511 fitted on the secondary shaft 44; the pressure reception portion 512 which extends outward from the one end 511a of the inner tubular portion 511 on the side of the secondary pulley 45; and the outer tubular portion 513 which extends from the outer peripheral portion of the pressure reception portion 512 toward the side opposite to the secondary pulley 45. The hydraulic clutch 80 includes: the clutch piston 81 which is disposed between the inner tubular portion 511 and the outer tubular portion 513; the clutch hub 82, at least a part (tubular portion 821) of which is disposed between the inner tubular portion 511 and the outer tubular portion 513; the plurality of first clutch plates 83 which are fitted with the outer tubular portion 513; and the plurality of second clutch plates 84 which are fitted with the clutch hub 82 and which are frictionally engageable with the plurality of first clutch plates 83. Consequently, the secondary piston 51 (outer tubular portion 513) of the second hydraulic actuator 48 can be used also as the clutch drum of the hydraulic clutch 80, and thus it is possible to suppress an increase in axial length which is caused by providing the hydraulic clutch 80 with a dedicated clutch drum. In addition, by disposing the constituent members of the hydraulic clutch 80 in a space between the inner tubular portion 511 and the outer tubular portion 513 of the secondary piston 51 which constitutes the second hydraulic actuator 48, it is possible to favorably suppress an increase in axial length of the power transfer device 20 due to installation of the hydraulic clutch 80.

In addition, the secondary piston 51 of the second hydraulic actuator 48 is held by the stepped portion 44a and the nut 55. The stepped portion 44a is formed on the secondary shaft 44 so as to abut against the one end 511a of the inner tubular portion 511, and the nut 55 is screwed to the secondary shaft 44 on the side of the other end 511b of the inner tubular portion 511. Consequently, movement of the secondary piston 51 of the second hydraulic actuator 48 in the axial direction can be reliably restricted.

The power transfer device 20 according to the embodiment described above may be considered as a power transfer device in which a cancellation oil chamber for canceling a centrifugal hydraulic pressure generated in the oil chamber of the second hydraulic actuator 48 of the CVT 40 is not formed on the side of the back surface of the secondary piston 51, and in which the hydraulic clutch 80 is disposed in the space for the cancellation oil chamber. Thus, the power transfer device 20 discussed above is preferably configured to include the CVT 40 with a relatively small capacity. It should be noted, however, that a cancellation oil chamber may be formed in the second hydraulic actuator 48 of the CVT 40. In the embodiment described above, in addition, the secondary piston 51 is constituted by integrally molding the inner tubular portion 511, the pressure reception portion 512, and the outer tubular portion 513. However, the present embodiment is not limited thereto. That is, the secondary piston 51 may be constituted by integrally molding the inner tubular portion 511 and the pressure reception portion 512 and fixing the separate outer tubular portion 513 which functions as the clutch drum of the hydraulic clutch 80 to an appropriate location (such as the outer peripheral portion, for example) of the pressure reception portion 512.

Figure 3:
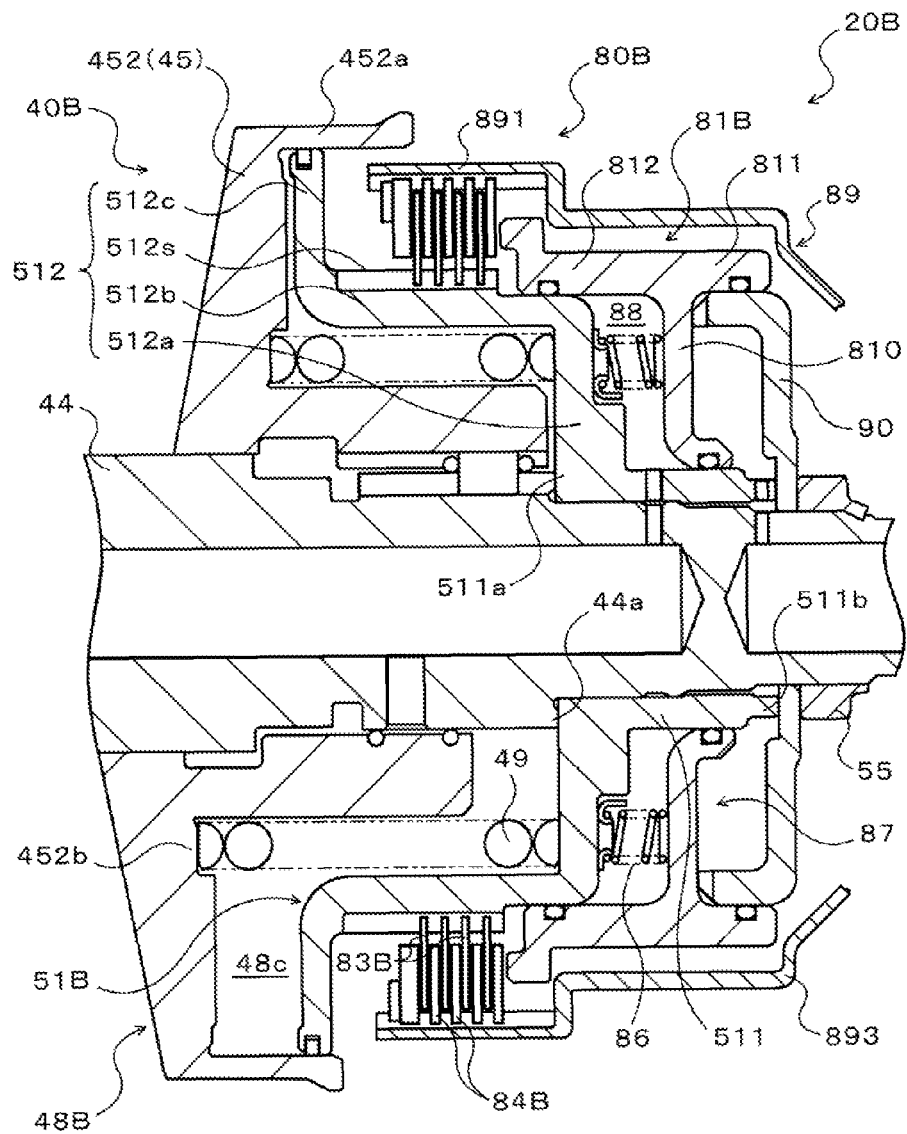
FIG. 3 is an enlarged partial sectional view illustrating an essential portion of a power transfer device 20B according to another embodiment.

FIG. 3 is an enlarged partial sectional view illustrating an essential portion of a power transfer device 20B according to another embodiment. Elements that are identical to the elements described in relation to the power transfer device 20 discussed above are given the same reference numerals to omit redundant descriptions.

As illustrated FIG. 3, a secondary piston 51B which constitutes a second hydraulic actuator 48B of a CVT 40B is constituted as a tubular member that includes: an inner tubular portion 511 fitted on the secondary shaft 44 to extend in the axial direction of the secondary shaft 44; and a pressure reception portion 512 that extends outward from one end 511a of the inner tubular portion 511 on the side of the secondary pulley 45 (movable sheave 452) to the outer side of the secondary shaft 44. The pressure reception portion 512 of the secondary piston 51B includes: a first pressure reception portion 512a that extends outward in the radial direction of the secondary shaft 44 from the one end 511a of the inner tubular portion 511; a tubular axially extending portion 512b that extends in the axial direction of the secondary shaft 44 from the outer peripheral portion of the first pressure reception portion 512a toward the secondary pulley 45 (movable sheave 452); and a second pressure reception portion 512c that extends outward in the radial direction of the secondary shaft 44 from one end of the axially extending portion 512b on the side of the secondary pulley 45 (movable sheave 452). In addition, splines 512s are formed on a part of the outer peripheral surface of the axially extending portion 512b of the pressure reception portion 512 so as to be proximate to the second pressure reception portion 512c, and a part of the outer peripheral surface of the axially extending portion 512b that is proximate to the first pressure reception portion 512a is formed as a smooth circular columnar surface that is smaller in diameter than the addendum circle of the splines 512s.

The secondary piston 51B is fitted (spline-fitted) on the secondary shaft 44 with the one end 511a of the inner tubular portion 511 on the side of the secondary pulley 45 (movable sheave 452) abutting against a stepped portion 44a formed on the secondary shaft 44 and with the inner peripheral surface of the tubular extending portion 452a of the movable sheave 452 supported by the secondary shaft 44 and the outer peripheral surface of the second pressure reception portion 512c in sliding contact with each other via a seal member. Consequently, the movable sheave 452 and the secondary piston 51B define the oil chamber 48c. Further, the return spring 49 which urges the movable sheave 452 toward the fixed sheave is disposed between the pressure reception portion 512 (first pressure reception portion 512a) of the secondary piston 51B and the abutment portion 452b of the movable sheave 452. Consequently, the movable sheave 452 of the secondary pulley 45 can be urged toward the fixed sheave by the return spring 49 to restrict movement of the movable sheave 452 even if a hydraulic pressure is not supplied from the hydraulic control device to the second hydraulic actuator 48B when the vehicle is towed with operation of the oil pump 30 stopped as operation of the engine is stopped.

In addition, the secondary piston 51B configured as discussed above, that is, the axially extending portion 512b of the pressure reception portion 512 which has the splines 512s, is used also as the clutch hub of the hydraulic clutch 80. The hydraulic clutch 80B is constituted as a hydraulic multi-plate friction clutch that includes: a clutch piston 81B fitted with the inner tubular portion 511 of the secondary piston 51B and supported by the secondary piston 51B so as to be movable in the axial direction; a clutch drum 89 supported by the counter drive gear; a plurality of first clutch plates (friction plates) 83B, the inner peripheral portion of which is fitted with the splines 512s formed on the outer peripheral surface of the axially extending portion 512b of the pressure reception portion 512; a plurality of second clutch plates (separator plates) 84B, the outer peripheral portion of which is fitted with splines formed on the inner peripheral surface of the clutch drum 89 and which are frictionally engageable with the plurality of first clutch plates 83B; and an oil chamber defining member 90 that defines the engagement oil chamber 87 together with the clutch piston 81B.

The clutch piston 81B includes: an annular pressure reception portion 810 fitted with the inner tubular portion 511 of the secondary piston 51B; a first tubular portion 811 that extends from the outer peripheral portion of the pressure reception portion 810 in the direction away from the movable sheave 452 of the CVT 40 (rightward in FIG. 3) and that defines the engagement oil chamber 87 together with the oil chamber defining member 90; and a second tubular portion 812 that extends from the outer peripheral portion of the pressure reception portion 810 toward the movable sheave 452 of the CVT 40 so as to be able to press the first and second clutch plates 83B and 84B.

The clutch piston 81B is fitted with the inner tubular portion 511 such that the inner peripheral surface of the pressure reception portion 810 is in sliding contact with the outer peripheral surface of the inner tubular portion 511 of the secondary piston 51B and the inner peripheral surface of the second tubular portion 812 is in sliding contact with the outer peripheral surface of the axially extending portion 512b of the secondary piston 51B on the side of the first pressure reception portion 512a. Further, a seal member is disposed between the inner peripheral surface of the pressure reception portion 810 and the outer peripheral surface of the inner tubular portion 511, and between the inner peripheral surface of the second tubular portion 812 and the outer peripheral surface of the axially extending portion 512b, and the return spring 86 is disposed between the pressure reception portion 810 and the first pressure reception portion 512a of the secondary piston 51B. Consequently, the clutch piston 81B defines the cancellation oil chamber 88 together with the first pressure reception portion 512a of the secondary piston 51B. That is, the secondary piston 51B which constitutes the second hydraulic actuator 48 is used also as the clutch hub of the hydraulic clutch 80, and used to define the cancellation oil chamber 88 of the hydraulic clutch 80.

The clutch drum 89 includes: a tubular portion 891 with which the second clutch plates 84B are spline-fitted; a base end portion (not illustrated) supported by the counter drive gear; and an intermediate portion 893 that extends between the tubular portion 891 and the base end portion. The clutch drum 89 is disposed such that the tubular portion 891 surrounds the splines 512s formed on the axially extending portion 512b of the secondary piston 51B, and the base end portion of the clutch drum 89 is coupled to one end portion of the counter drive gear on the side of the secondary pulley 45 (movable sheave 452) via splines. Consequently, the clutch drum 89 and the counter drive gear can rotate together with each other.

The oil chamber defining member 90 of the hydraulic clutch 80 is constituted as a bottomed tubular annular member, and includes a center hole into which the secondary shaft 44 is fitted, and a short tubular portion that extends in the axial direction from the outer peripheral portion. The oil chamber defining member 90 abuts against the other end 511b of the inner tubular portion 511 of the secondary piston 51B, and is fitted on the secondary shaft 44 such that the outer peripheral surface of the tubular portion is in sliding contact with the inner peripheral surface of the first tubular portion 811 of the clutch piston 81B. Further, a seal member is disposed between the outer peripheral surface of the tubular portion of the oil chamber defining member 90 and the inner peripheral surface of the first tubular portion 811. In addition, a screw portion is formed on the outer peripheral surface of the secondary shaft 44 so as to be positioned in the vicinity of the other end 511b of the inner tubular portion 511 with the inner tubular portion 511 of the secondary piston 51B fitted on the outer peripheral surface of the secondary shaft 44, and a nut 55 is screwed to the screw portion so as to abut against the oil chamber defining member 90. Consequently, the stepped portion 44a provided on the side of the one end 511a of the inner tubular portion 511 and the nut 55 screwed to the secondary shaft 44 on the side of the other end 511b of the secondary piston 51B can reliably restrict movement of the secondary piston 51 and the oil chamber defining member 90 in the axial direction.

The power transfer device 20B configured as discussed above can also execute belt return control for changing the speed ratio of the CVT 40B to the lowest speed side with the secondary shaft 44 of the CVT 40B and the axles 79 decoupled from each other by the hydraulic clutch 80B immediately before and while the vehicle is stopped. This makes it possible to suppress an increase in size of the oil pump which generates a hydraulic pressure to be supplied to the first and second hydraulic actuators 47 and 48B of the CVT 40B. Further, the secondary piston 51B which constitutes the second hydraulic actuator 48B of the CVT 40B is used to define the cancellation oil chamber 88 of the hydraulic clutch 80B. Thus, it is possible to suppress an increase in axial length which is caused by providing the hydraulic clutch 80B with a dedicated member for defining the cancellation oil chamber 88. Thus, also with the power transfer device 20B, it is possible to favorably suppress an increase in size of the device, and to decouple the CVT 40 and the axles 79 from each other.

In addition, the return spring 49 which urges the movable sheave 452 toward the fixed sheave of the secondary pulley 45 is disposed between the movable sheave 452 of the secondary pulley 45 and the secondary piston 51B of the second hydraulic actuator 48B. Consequently, the movable sheave 452 of the secondary pulley 45 can be urged toward the fixed sheave by the return spring 49 to restrict movement of the movable sheave 452 when the vehicle is towed with a hydraulic pressure not supplied to the second hydraulic actuator 48B of the CVT 40B as operation of the engine is stopped. Also in the power transfer device 20B, as in the power transfer device 20, a compact spring with a relatively small spring constant can be adopted as the return spring 49 which holds the movable sheave 452 of the secondary pulley 45, which makes it possible to easily secure a space for disposing the constituent members of the hydraulic clutch 80B in order to make the second hydraulic actuator 48B compact.

Further, the secondary piston 51B of the second hydraulic actuator 48B includes: the inner tubular portion 511 which is fitted on the secondary shaft 44; and the pressure reception portion 512 which extends outward from the one end 511a of the inner tubular portion 511 on the side of the secondary pulley 45 (movable sheave 452) and which includes the axially extending portion 512b which serves as a tubular hub portion having the splines 512s. The hydraulic clutch 80B includes: the clutch piston SIB which is fitted with the inner tubular portion 511 and which defines the cancellation oil chamber 88 together with the first pressure reception portion 512a of the pressure reception portion 512; the clutch drum 89 which is disposed such that at least a part (tubular portion 891) thereof surrounds the axially extending portion 512b (hub portion) of the pressure reception portion 512; the plurality of first clutch plates 83B which are fitted with the axially extending portion 512b of the pressure reception portion 512; and the second clutch plates 84B which are fitted with the tubular portion 891 of the clutch drum 89 and which are frictionally engageable with the first clutch plates 83B. Consequently, the secondary piston 51B of the second hydraulic actuator 48B can be used also as the clutch hub of the hydraulic clutch 80B, and thus it is possible to suppress an increase in axial length which is caused by providing the hydraulic clutch 80B with a dedicated clutch hub.

In addition, the secondary piston 51B of the second hydraulic actuator 48B is also held by the stepped portion 44a and the nut 55. The stepped portion 44a is formed on the secondary shaft 44 so as to abut against the one end 511a of the inner tubular portion 511, and the nut 55 is screwed to the secondary shaft 44 on the side of the other end 511b of the inner tubular portion 511. Consequently, movement of the secondary piston 51B of the second hydraulic actuator 48B in the axial direction can be reliably restricted.

In the power transfer device 20B discussed above, the second hydraulic actuator 48B of the CVT 40B may be provided with a cancellation oil chamber. In the power transfer device 20B, in addition, the secondary piston 51 may be constituted by integrally molding the inner tubular portion 511 and the pressure reception portion 512 and fixing a separate tubular portion (hub portion) that functions as the clutch hub of the hydraulic clutch 80 to an appropriate location (such as the second pressure reception portion 512c, for example) of the pressure reception portion 512.

Here, the correspondence between the main elements of the embodiments etc. described above and the main elements of exemplary embodiments described in the "SUMMARY OF THE INVENTION" section will be described. That is, in the embodiments etc. described above, The CVT 40, 40B, which includes: the primary pulley 43 provided on the primary shaft 42 which is coupled to the engine of the vehicle and having a groove with a changeable groove width; the secondary pulley 45 provided on the secondary shaft 44 which is coupled to the axles 79 of the vehicle and having a groove with a changeable groove width; the belt 46 which extends between the primary pulley 43 and the secondary pulley 45; the first hydraulic actuator 47 which changes the groove width of the primary pulley 43; and the second hydraulic actuator 48, 48B which changes the groove width of the secondary pulley 45, 45B, corresponds to the "continuously variable transmission". The oil pump 30 which generates a hydraulic pressure to be supplied to the first and second hydraulic actuators 47, 48, 48B corresponds to the "oil pump". The hydraulic clutch 80, 80B which couples and decouples the secondary shaft 44 of the CVT 40, 40B and the axles 79 to and from each other corresponds to the "hydraulic clutch". The movable sheave 452 which is movably supported on the secondary shaft 44 corresponds to the "movable sheave". The secondary piston 51, 51B which rotates together with the secondary shaft 44 and which constitutes the second hydraulic actuator 48 together with the movable sheave 452 of the secondary pulley 45 corresponds to the "piston". It should be noted, however, that the correspondence between the main elements of the embodiments described above and the main elements of the embodiments described in the "SUMMARY OF THE INVENTION" section does not limit the elements of the invention described in the "SUMMARY OF THE INVENTION" section, because the embodiments are examples given for the purpose of specifically describing the invention described in the "SUMMARY OF THE INVENTION" section. That is, the embodiments are merely specific examples of the invention described in the "SUMMARY OF THE INVENTION" section, and the invention described in the "SUMMARY OF THE INVENTION" section should be construed on the basis of the description in that section.

While embodiments of the present invention have been described above, it is a matter of course that the present invention is not limited to the embodiments described above in any way, and that the present invention may be modified in various ways without departing from the scope and sprit of the present invention.

INDUSTRIAL APPLICABILITY

The present invention can be utilized in the power transfer device manufacturing industry etc.

The invention claimed is:
1. A power transfer device that includes a continuously variable transmission and an oil pump, the continuously variable transmission including a first pulley provided on a driving rotary shaft coupled to a motor of a vehicle and having a groove with a changeable groove width, a second pulley provided on a driven rotary shaft coupled to axles of the vehicle and having a groove with a changeable groove width, a belt that extends between the first and second pulleys, a first hydraulic actuator that changes the groove width of the first pulley, and a second hydraulic actuator that changes the groove width of the second pulley, and the oil pump generating a hydraulic pressure to be supplied to the first and second hydraulic actuators, comprising:
- a hydraulic clutch that couples and decouples the driven rotary shaft of the continuously variable transmission and the axles to and from each other, wherein:
- the second pulley of the continuously variable transmission includes a movable sheave movably supported by the driven rotary shaft, and a piston that rotates together with the driven rotary shaft and that constitutes the second hydraulic actuator together with the movable sheave;
- the piston of the second hydraulic actuator is used to define an engagement oil chamber of the hydraulic clutch;
- the piston of the second hydraulic actuator is fitted with the driven rotary shaft and is coupled to a clutch hub of the hydraulic clutch by supplying a hydraulic pressure to the engagement oil chamber such that torque is transferred from the driven rotary shaft to the clutch hub via the piston, and the clutch hub is supported by a drive gear into which the driven rotary shaft is rotatably inserted and is coupled to the axles through the drive gear; and
- friction plates of the hydraulic clutch are supported by the piston of the second hydraulic actuator.

2. The power transfer device according to claim 1, wherein
- a return spring that urges the movable sheave toward a fixed sheave of the second pulley is disposed between the movable sheave of the second pulley and the piston of the second hydraulic actuator.

3. The power transfer device according to claim 1, wherein:
- the piston of the second hydraulic actuator includes an inner tubular portion fitted on the driven rotary shaft, a pressure reception portion that extends outward from one end of the inner tubular portion on a side of the second pulley, and an outer tubular portion that extends from an outer peripheral portion of the pressure reception portion toward a side opposite to the second pulley; and
- the hydraulic clutch includes a clutch piston disposed between the inner tubular portion and the outer tubular portion, the clutch hub, at least a part of which is disposed between the inner tubular portion and the outer tubular portion, a first clutch plate fitted with the outer tubular portion, and a second clutch plate that is fitted with the clutch hub and that is frictionally engageable with the first clutch plate.

4. The power transfer device according to claim 3, wherein
- the piston of the second hydraulic actuator is held by a stepped portion formed on the driven rotary shaft so as to abut against the one end of the inner tubular portion, and a nut screwed to the driven rotary shaft on a side of the other end of the inner tubular portion.

5. A power transfer device that includes a continuously variable transmission and an oil pump, the continuously variable transmission including a first pulley provided on a driving rotary shaft coupled to a motor of a vehicle and having a groove with a changeable groove width, a second pulley provided on a driven rotary shaft coupled to axles of the vehicle and having a groove with a changeable groove width, a belt that extends between the first and second pulleys, a first hydraulic actuator that changes the groove width of the first pulley, and a second hydraulic actuator that changes the groove width of the second pulley, and the oil pump generating a hydraulic pressure to be supplied to the first and second hydraulic actuators, comprising:
- a hydraulic clutch that couples and decouples the driven rotary shaft of the continuously variable transmission and the axles to and from each other, wherein:
- the second pulley of the continuously variable transmission includes a movable sheave movably supported by the driven rotary shaft, and a piston that rotates together with the driven rotary shaft and that constitutes the second hydraulic actuator together with the movable sheave; and
- the piston of the second hydraulic actuator is used to define a cancellation oil chamber for canceling a centrifugal hydraulic pressure generated in an engagement oil chamber of the hydraulic clutch.

6. The power transfer device according to claim 5, wherein
- a return spring that urges the movable sheave toward a fixed sheave of the second pulley is disposed between the movable sheave of the second pulley and the piston of the second hydraulic actuator.

7. The power transfer device according to claim 5, wherein
- the piston of the second hydraulic actuator includes an inner tubular portion fitted on the driven rotary shaft, and a pressure reception portion that extends outward from one end of the inner tubular portion on a side of the second pulley and that includes a tubular hub portion; and
- the hydraulic clutch includes a clutch piston that is fitted with the inner tubular portion and that defines the cancellation oil chamber together with the pressure reception portion, a clutch drum, at least a part of which is disposed so as to surround the hub portion of the pressure reception portion, a first clutch plate fitted with the hub portion of the pressure reception portion, and a second clutch plate that is fitted with the clutch drum and that is frictionally engageable with the first clutch plate.

8. The power transfer device according to claim 7, wherein
- the piston of the second hydraulic actuator is held by a stepped portion formed on the driven rotary shaft so as to abut against the one end of the inner tubular portion, and a nut screwed to the driven rotary shaft on a side of the other end of the inner tubular portion.

9. The power transfer device according to claim 2, wherein
- the piston of the second hydraulic actuator includes an inner tubular portion fitted on the driven rotary shaft, a pressure reception portion that extends outward from one end of the inner tubular portion on a side of the second pulley, and an outer tubular portion that extends from an outer peripheral portion of the pressure reception portion toward a side opposite to the second pulley; and
- the hydraulic clutch includes a clutch piston disposed between the inner tubular portion and the outer tubular portion, the clutch hub, at least a part of which is disposed between the inner tubular portion and the outer tubular portion, a first clutch plate fitted with the outer tubular portion, and a second clutch plate that is fitted with the clutch hub and that is frictionally engageable with the first clutch plate.

10. The power transfer device according to claim 9, wherein
the piston of the second hydraulic actuator is held by a stepped portion formed on the driven rotary shaft so as to abut against the one end of the inner tubular portion, and a nut screwed to the driven rotary shaft on a side of the other end of the inner tubular portion.

11. The power transfer device according to claim 6, wherein
the piston of the second hydraulic actuator includes an inner tubular portion fitted on the driven rotary shaft, and a pressure reception portion that extends outward from one end of the inner tubular portion on a side of the second pulley and that includes a tubular hub portion; and
the hydraulic clutch includes a clutch piston that is fitted with the inner tubular portion and that defines the cancellation oil chamber together with the pressure reception portion, a clutch drum, at least a part of which is disposed so as to surround the hub portion of the pressure reception portion, a first clutch plate fitted with the hub portion of the pressure reception portion, and a second clutch plate that is fitted with the clutch drum and that is frictionally engageable with the first clutch plate.

12. The power transfer device according to claim 11, wherein
the piston of the second hydraulic actuator is held by a stepped portion formed on the driven rotary shaft so as to abut against the one end of the inner tubular portion, and a nut screwed to the driven rotary shaft on a side of the other end of the inner tubular portion.

13. The power transfer device according to claim 1, wherein
the friction plates are supported at a position radially outside of a part of the piston of the second hydraulic actuator.

14. The power transfer device according to claim 1, wherein
the friction plates axially overlap the piston of the second hydraulic actuator.

15. A power transfer device that includes a continuously variable transmission and an oil pump, the continuously variable transmission including a first pulley provided on a driving rotary shaft coupled to a motor of a vehicle and having a groove with a changeable groove width, a second pulley provided on a driven rotary shaft coupled to axles of the vehicle and having a groove with a changeable groove width, a belt that extends between the first and second pulleys, a first hydraulic actuator that changes the groove width of the first pulley, and a second hydraulic actuator that changes the groove width of the second pulley, and the oil pump generating a hydraulic pressure to be supplied to the first and second hydraulic actuators, comprising:
a hydraulic clutch that couples and decouples the driven rotary shaft of the continuously variable transmission and the axles to and from each other, wherein:
the second pulley of the continuously variable transmission includes a movable sheave movably supported by the driven rotary shaft, and a piston that rotates together with the driven rotary shaft and that constitutes the second hydraulic actuator together with the movable sheave;
the piston of the second hydraulic actuator is used to define an engagement oil chamber of the hydraulic clutch;
an oil path that supplies a hydraulic pressure to an oil chamber of the second hydraulic actuator that changes the groove width of the second pulley and an oil path that supplies a hydraulic pressure to the engagement oil chamber of the hydraulic clutch are provided in the driven rotary shaft independently from each other.

16. The power transfer device according to claim 15, wherein
a return spring that urges the movable sheave toward a fixed sheave of the second pulley is disposed between the movable sheave of the second pulley and the piston of the second hydraulic actuator.

17. The power transfer device according to claim 15, wherein:
the piston of the second hydraulic actuator includes an inner tubular portion fitted on the driven rotary shaft, a pressure reception portion that extends outward from one end of the inner tubular portion on a side of the second pulley, and an outer tubular portion that extends from an outer peripheral portion of the pressure reception portion toward a side opposite to the second pulley; and
the hydraulic clutch includes a clutch piston disposed between the inner tubular portion and the outer tubular portion, a clutch hub, at least a part of which is disposed between the inner tubular portion and the outer tubular portion, a first clutch plate fitted with the outer tubular portion, and a second clutch plate that is fitted with the clutch hub and that is frictionally engageable with the first clutch plate.

18. The power transfer device according to claim 17, wherein
the piston of the second hydraulic actuator is held by a stepped portion formed on the driven rotary shaft so as to abut against the one end of the inner tubular portion, and a nut screwed to the driven rotary shaft on a side of the other end of the inner tubular portion.

19. The power transfer device according to claim 16, wherein
the piston of the second hydraulic actuator includes an inner tubular portion fitted on the driven rotary shaft, a pressure reception portion that extends outward from one end of the inner tubular portion on a side of the second pulley, and an outer tubular portion that extends from an outer peripheral portion of the pressure reception portion toward a side opposite to the second pulley; and
the hydraulic clutch includes a clutch piston disposed between the inner tubular portion and the outer tubular portion, a clutch hub, at least a part of which is disposed between the inner tubular portion and the outer tubular portion, a first clutch plate fitted with the outer tubular portion, and a second clutch plate that is fitted with the clutch hub and that is frictionally engageable with the first clutch plate.

20. The power transfer device according to claim 19, wherein
the piston of the second hydraulic actuator is held by a stepped portion formed on the driven rotary shaft so as to abut against the one end of the inner tubular portion, and a nut screwed to the driven rotary shaft on a side of the other end of the inner tubular portion.

* * * * *